United States Patent Office 2,992,124
Patented July 11, 1961

2,992,124
RESINOUS COMPOSITION AND METHOD
Joseph A. Campbell, Hermosa Beach, Calif., assignor to X-Port Oils, Inc., Los Angeles, Calif., a corporation of California
No Drawing. Filed May 10, 1956, Ser. No. 583,916
11 Claims. (Cl. 117—7)

The present invention relates to a resin composition particularly adapted for use in forming strong objects reinforced with glass fibers, the resulting objects being characterized by high strength, resistance to heat, and homogeneous transmission characteristics with respect to ultra high frequency waves.

Radar domes and other structures through which ultra high frequency waves are transmitted must have uniform homogeneous characteristics to the passage of such waves and not disperse or cause uncontrolled deviation from the desired pattern or direction in which such waves are either transmitted or received through the panel, object, radar dome or the like. Resinous compositions have very litle refractive effect upon UHF waves whereas glass fibers, usually employed as a reinforcing agent in such formed objects exhibit a pronounced refractive effect, the deviation or effect being generally measured and expressed as a loss tangent. A panel or dome made of glass fabric impregnated with a resin is not homogeneous in its transmission characteristics since in one incremental area of such dome there may be a very high proportion of glass fibers while in another incremental area of such dome there may be a very low or negligible amount of glass fibers and a very high proportion of resin.

The industrial arts are in need of reinforced resinous compositions which are homogeneous and uniform to the passage of UHF waves and transmissions, and which also are stable and strong at temperatures in excess of 500° F. Guided missiles and military aircraft are attaining speeds and reaching into stratospheric areas where the missile or aircraft is subjected to relatively high temperatures. These temperatures may be due to skin friction, for example, on reentry of high speed missiles into denser layers of atmosphere, or to pasage through zones of high temperature. It is necessary, therefore, to make certain that adhesives and formed parts employed are capable of withstanding temperatures on the order of 700° F. to 1000° F. and for short periods temperatures as high as 2000° F. to 3000° F., or higher, without destruction or material loss in strength. Portions of guided missiles associated with electronic equipment, such as radomes, radar heads, war heads, target-following units, and other structures transmitting UHF impulses, can well be made from resin-impregnates or resinous laminates and thereby decrease the dead weight of the missile, aircraft or following device, provided such resins posses a high degree of uniformity of electrical characteristics and do not loss their strength and mechanical stability at high temperatures of about 5000° F. Moreover, by using thermosetting resins and normal molding and forming techniques, the various component parts of aircraft and guided missiles can be manufactured much more economically and in considerably less time than is required with present materials and techniques.

Generally stated, the present invention is based on the discovery that when glass laminates and fabrics are impregnated with resins in which a relatively high concentration of colloidal silica is uniformly-dispersed (on the order of 20% to 75% colloidal silica on a solvent free basis) the impregnated materials can be shaped and cured in the desired form to produce bodies having unusual physical strength, resistance to heat, and a particular adaptability for use in electronic devices due to their uniform permeability to UHF impulse waves. Moreover, these advantageous properties can be further improved by novel modifications in impregnating procedures whereby the impregnated fabric can be partially cured to hold the woven fibers in trapezoidal form so that the width of the spaces between adjacent fibers is reduced to approximately 70% to 80% of the original width. The net effect is to increase the ratio of glass fibres to resin in the final products, and thereby permit a corresponding increase in desirable physical and electrical characteristics.

A simplified flow diagram of the process is as follows:

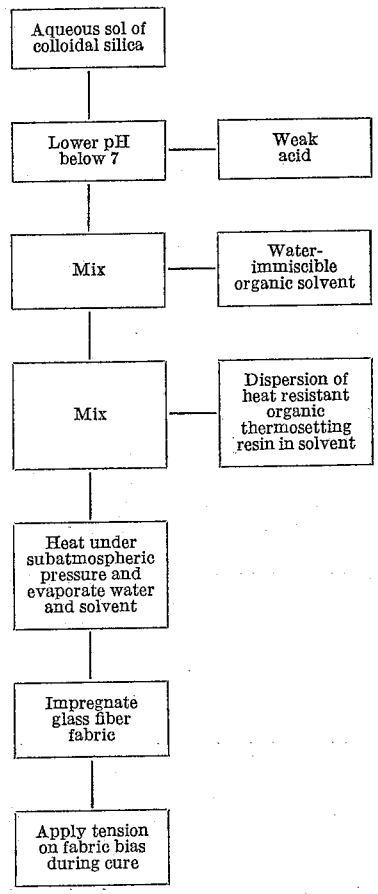

In my copending application, Serial number 290,087, filed May 26, 1952, now Patent No. 2,753,316, improvements in the manufacture of thermosetting resins are described whereby stability, strength and dielectrical characteristics are retained at temperatures in excess of 500° F. so that fabrics made out of spun glass and impregnated with the resins can be formed or molded into objects capable of being subjected to temperatures as high as 750° F. without loss of physical characteristics. Generally, the unexpectedly beneficial results of my invention, as there described, are obtained primarily by etherization of the phenol used in the production of a thermosetting resin of the phenol-aldehyde type. The desirable results obtained may be enhanced by the formation in situ within the resins during setting of very finely divided solid reinforcing material in the form of colloidal silica, the collodal silica being incorporaated into the liquid thermosetting resins by means of an hydrous alcohol or other organic solvent. The resulting resinous compositions provde substantially impervious cured resinous bodies of exceptional heat resistance as evidenced by physical and dielectric strength.

Notwithstanding the demonstrated usefulness of resinous compositions and impregnated products prepared in the above manner, they nevertheless are subject to certain shortcomings.

(1) Colloidal silica, as a heat resistant, reinforcing agent, is not easily incorporated in the impregnating resins in amounts greater than about 15% to 20% by weight of the resin, higher concentrations tending to cause agglomeration or gelation of the silicious material. The problem is intensified when conventional silica sols comprising colloidal dispersions of silica in aqueous media are employed.

(2) Glass fabrics impregnated with the resins, particularly where the glass fabric is to be used in the manufacture of radomes and the like, have not been found to possess a uniform electrical characteristic. This is due to the fact that the glass fiber content is not homogeneously distributed, larger quantities or concentrations of resin existing in the openings between threads of the weave.

(3) The resistance to heat and "burn-through" of such impregnated fabrics at temperatures on the order of 2,000° F. to 3,000° F. is limited and exists only for relatively short periods of time; yet such temperatures are commonly encountered, for example, on re-entry of missiles into denser layers of the earth's atmosphere.

The present invention is directed to improvements in the manufacture of resinous compositions, particularly modified phenolic resins, whereby resin-impregnated glass fabrics and laminates exhibiting a high degree of uniformity of electrical characteristics, improved elasticity and flexural strength, and remarkable resistance to heat and "burn-through" at temperatures as high as 2000° F. to 3000° F. may be produced, said materials being further characterized by resin-to-glass ratios as low as 1:10. It is to be understood that the invention also applies to such resinous compositions reinforced with glass fibers in the form of mats or loose glass fibers; for example glass fibers made in conventional manner from a borosilicate glass composition.

Another object of this invention is to disclose and provide methods whereby void spaces between fibers of a reinforcing fabric, such as glass fiber fabric, can be materially reduced and cured resinous objects obtained in which the resin-fabric ratio is of a low order, such cured objects having enhanced and novel properties and characteristics.

Another object of the invention is to provide methods of producing stable concentrated suspensions of finely divided silica which are compatable with and readily incorporated in resinous compositions, said suspension containing above 35% and as much as 50% to 75% by weight of silica.

Other objects and advantages of the invention will be apparent from the following description of the invention and from the specific examples enumerated therein.

The present invention is applicable for use with various thermosetting resins, such as the condensation products of reaction between formaldehyde and a phenol, with the high temperature thermosetting resins described in my copending application, and disclosing etherized condensation products such as those obtained by condensation of an alkyl ether of phenol and an aldehyde, resins such as the various triallylcyanurates, polyester resins, etc. These resins are generally available commercially as syrupy dispersions of resin in solvent. Epoxy type resins capable of being cured by the application of some heat may also be employed. In general, phenolic resins in which 60 to 85% of the cross blending possibilities have been saturated are eminently suited for use in accordance with the invention, due to their unusually desirable high temperature characteristics.

As indicated in United States Patent 2,574,902, issued November 13, 1951, to Max F. Bachtold et al., colloidal silica is commercially available in the form of silica sols containing up to about 30% silica. By "silica sols" is meant colloidal dispersions of silica in aqueous media wherein the size of the silica particles ranges from about 1 to 100 millimicrons. These silica sols have poor stability and have a tendency to gel upon standing at concentrations of silica of about 15 to 30%. When added to dispersions of resin in solvent, even in small amounts, gelation or agglomeration of the silica almost inevitably results. According to the present invention, however, colloidal silica can be incorporated into impregnating resins in substantially increased amounts, frequently as high as 75% of the weight of the resin, without agglomeration of gelation and with advantages alteration of physical properties, heat resistance and loss tangency characteristics towards UHF waves.

The novel impregnating resins of the invention can be prepared in a number of ways. According to one technique a concentrated suspension of silica is obtained by first lowering the pH of a silica sol to below 7, preferably to about 5–6, by the addition of a very weak acid such as carbonic, boric, phosphoric, citric or acetic acid. Because of its fleeting nature and ability to readily decompose into water and carbon dioxide, carbonic acid is the preferred acid and may be formed in situ by adding carbon dioxide gas under either atmospheric or superatmospheric pressures. Preferably, the carbon dioxide is added in quantities sufficient to saturate the solution since this seems to render the resulting silica suspensions more receptive to resins without lowering pH below desired limits. Stronger acid radicals such as sulfur dioxide or chlorine could be used but these have been determined to be detrimental to the glass fibers or fabrics, resulting in serious weakening or loss of desirable physical characteristics of the final impregnated bodies.

The treated silica sol is then mixed with a low boiling water-miscible organic solvent, such as acetone, methyl alcohol, ethyl alcohol, isopropyl alcohol, or other solvents having a boiling point below about 200° F. The solvent is preferably added in proportions approximately equal to the amount of water present, although greater or lesser amounts of solvent will provide satisfactory results. Thereafter, the suspension of silica in solvent and water is subjected to heat and subatmospheric pressure, preferably in excess of about 24 inches of Hg, to cause evaporation of water and solvent while additional solvent is simultaneously added to maintain the boiling point of the suspension substantially constant within a range from about 180° F. to about 190° F. The evaporation is preferably continued until virtually all the water is removed and in any event until sufficient water and solvent have been removed to cause substantial concentration of the siliceous suspension. In this way, suspensions of colloidal silica containing more than 35% and as high as 50% to 75% silica solids by weight can be readily produced without any tendency towards agglomeration or gelation of the silica particles. These concentrated silica suspensions may be then blended with any desired resinous composition, such as phenolic, polyester, epoxy etc.

According to the invention, a resinous impregnating solution may now be prepared by slowly adding to the siliceous suspension, with agitation, a dispersion or solution of a heat-resistant thermosetting resin in syrup form, such blending taking place at temperatures of from atmospheric to about 110° F. Satisfactory results can also be had, however, by adding the concentrated suspension to the resin. It is desirable that the syrupy resin previously be saturated with carbon dioxide, preferably by shaking in the presence of the gas under a pressure of from 40 to 80 p.s.i. In some cases it may be desirable to also conduct the blending operation under a blanket of carbon dioxide gas. The phenolic resins of the type referred to in my copending application are employed, such phenolic resin contains between about 60 to 70% solids, the balance being composed of a vaporizable organic solvent such as acetone, methyl ethyl ketone or alcohol and generally including a small amount of water. The water content may be as low as 2% but often comprises 6% or even 12% of the total.

The resulting siliceous resinous syrup mixture is then subjected to heat and subatmospheric pressure to cause further gradual evaporation of solvent at temperatures below about 165° F. and preferably below 150° F. By a continued evaporation of solvent the resin can in effect be substituted for the solvent in the concentrated silica suspension so that the resin also can be made to carry colloidal silica in proportion of solids by weight as high as 25% to 60%. Moreover, the resulting impregnating resin being substantially anhydrous is more compatible with and consequently more easily blended with other resinous compositions dispersed in water-immiscible solvent, such as polyester resins and epoxy resins.

In applications where the presence of water in the impregnating resin is not a problem, it may be desirable to add the resinous dispersion directly to the initial silica suspension prior to subjecting the entire mass to heat and subatmospheric pressures. In this case, a dispersion of heat-resistant resin is preferably added to the initial solvent silica mixture in a proportion to achieve a ratio of resin to silica of about 1:3 to 1:5 and a total solid content of about 30% to 40%. If desired, the fabric may be impregnated at this point, but preferably the solvent-silica-resin mixture is subjected to heat and vacuum to evaporate sufficient water and solvent to produce a final mixture containing as much as 75% of colloidal silica in the solid phase. Although the theory involved is not clearly understood, it is believed that gelling is prevented at such high silica concentrations by absorption of the phenol resin directly on the colloidal silica particles, prior to the concentration of the solution by evaporation.

Glass fabrics and other such materials can be easily impregnated or coated in conventional manner with the silica reinforced impregnating resins of the invention; for example, fabrics may be dipped into the resinous siliceous solution, permitted to dry, and then be pressed or formed under heat into desired shapes and objects. Pressing may take place at from about 10 p.s.i. to over 1,000 p.s.i. and final curing at temperatures of from 250° F. to 450° F. Layers of such impregnated cloth in superimposed relation may be used in forming various objects and laminates.

Glass fabrics impregnated with modified resins of the invention possess a remarkable degree of uniformity of electrical characteristics. It has been determined that colloidal silicon dioxide has a refractive index and consequently a loss tangent that approximately equals that of the glass fibers. The present invention utilizes this property, the quantity of silicon dioxide blended with the thermosetting resin being balanced against the quantity of glass fibers in the impregnated articles to produce homogenity in the transmission characteristics of the finished article. When the glass fiber reinforcing is made of a borosilicate glass composition (employing less than 1% alkali in its formulation), the resin preferably contains between 20% and 25% on a solvent free basis of colloidal silica in homogeneous dispersion. When such resin is then used in producing the formed, cured, reinforced object, such object will be found to comprise approximately 50% glass fibers, approximately 39% of resin, and 11% of silicon dioxide. It is to be understood that some variation may be necessary from these specific proportions, depending upon the inherent refractive characteristics of the fabric or glass fibers used, but the preferred properties are attained within the range of 48% to 52% of glass fibers, 35% to 42% of resin and 10% to 13% of colloidal silica.

The resin-impregnated fabrics of the invention also possess outstanding resistance to heat, particularly as evidenced by resistance to burn through at temperatures ranging from 2,000° F. to 3,000° F., and higher. It has been found that best results are achieved at concentrations of $SiO_2$ in the impregnating-resin in excess of about 60% and ranging upwards to about 75% $SiO_2$. For example, within the range specified, the time required to penetrate resin-impregnated glass fabrics held at the apex of a 3/16" blue cone provided by a welding torch (employing an Oxyweld No. 0 tip) is increased from about ½ minute to as long as 7–10 minutes, or longer. In this test, which has been adopted as a standard measure of resistance to burn-through, the approximate temperature at the apex of the flame cone is about 2,200° to 2,300° F. Based on these results, the usefulness of the resin-impregnated fabrics in guided missiles and other such applications becomes immediately apparent, since the period of high temperature on re-entry of such missiles into the earth's atmosphere may well be as long as 3 to 5 minutes.

The resin-impregnated glass materials are further characterized by improved elasticity and flexural strength. For example, impregnated fabrics have a sheer strength of over 600 p.s.i. at 500° F. and exhibit a flexural strength of from 60,000 to 100,000 p.s.i. after one-half hour at 500° F., some specimens exhibiting flexural strength of over 100,000 p.s.i. These sheer and flexural strength characteristics are substantially unchanged at 700° F. to 1,000° F.

It has also been found that the above results and desirable properties can be further substantially improved by the simple expedient of converting rectangular pieces of glass fabric impregnated with resins into trapezoidal shapes, whereby the width of the fabric is substantially reduced, say from 70% to 80% of its original width. Such conversion or re-arrangement of the woven strands of the glass fabric can be accomplished either before or immediately after dipping in the resin. In the case of the phenolics, the dipped fabric may then be partially cured at 200° F. to 275° F. to retain the converted shape, and thereafter formed into a desired shape and subjected to final curing temperatures in excess of about 275° F. The net effect is to reduce the size of the spaces between the woven fibers so that the total quantity of resin absorbed by the fabric and deposited in such spaces is substantially reduced. For example, the proportion of resin may be reduced from about 25% to 30% to as low as 10% to 20% resin by weight. As the resin pockets tend to be reduced in size or to disappear, the electrical characteristics of the resultant fabric becomes correspondingly more uniform, due to the greater proportion of glass in the final product.

It will of course be understood that the invention is not limited to rectangular fabrics or to rectangular spaces between woven fibers (which are subsequently converted to trapezoidal configuration) but has application to any glass fiber fabric having warp, woof and bias, and which is therefore subject to rearrangement of the fibers or spaces between fibers in response to tension brought to bear on the bias of the fabric to reduce the size of void spaces between the fibers. Moreover, in addition to improved electrical characteristics, deformation of the glass fabric also results in a substantial improvement in the physical properties of the fabric and its characteristics of heat resistance. For example, flexural strength has been found to increase as much as 40%, Young's modulus of elasticity to as high as 5 to 6, and sheer strength to as high as 800 p.s.i. at 500° F. The finished objects made in accordance with this phase of the invention likewise possess extremely high resistance to "burn-through" at high temperatures.

To those skilled in the art to which this invention relates, widely differing procedures, embodiments and applications of the invention will suggest themselves without departing from the spirit and scope of the invention. The disclosures and the description herein are purely illustrative and not intended to be in any sense limiting.

I claim:

1. A method adapted to rendering uniform the electrical characteristics of glass laminates and fabrics impregnated with heat-resistant resins and of improving the physical properties and characteristics of heat resistance, which comprises: lowering the pH of an aqueous sol of colloidal silica to below 7 by the addition of weak acid; mixing said siliceous sol with a substantial amount of a water-miscible organic solvent; subjecting the resulting siliceous suspension to heat and subatmospheric pressure to cause evaporation of water and solvent while simultaneously adding additional solvent to maintain the boiling point of the mixture substantially constant within a range from about 180° to about 190° F., said evaporation being continued until virtually all of the water is removed; slowly adding a dispersion of heat resistant organic thermosetting resin in solvent, with agitation, to produce a siliceous resinous syrup; subjecting said syrup to heat and subatmospheric pressure to cause further gradual evaporation of solvent at temperatures below about 165° F. said gradual evaporation being continued until a concentrated syrup is produced containing from 40% to 70% resin solids and correspondingly from 20% to 60% colloidal silica solids; and combining said concentrated syrup with glass fiber reinforcing in the production of resin composition objects.

2. The method of claim 1 wherein the weak acid is selected from the group consisting of carbonic, boric, phosphoric, citric and acetic acids.

3. The method of claim 2 wherein the weak acid is carbonic acid.

4. The method of claim 1 wherein said heat-resistant resin is a liquid thermosetting, resinous composition produced by the condensation of a phenol and an aldehyde.

5. The method of claim 1 wherein said heat-resistant resin is a liquid thermosetting, condensation product of an alkyl ether of phenol and an aldehyde.

6. A method adapted to rendering uniform the electrical characteristics of glass fiber material laminates and fabrics impregnated with heat-resistant resins and of improving the physical strength and characteristics of heat resistance of the glass material, which comprises: lowering the pH of an aqueous sol of colloidal silica to below 7 by the addition of weak acid; mixing said sol in approximately equal proportions with a water-miscible, organic solvent; adding to this mixture a dispersion of heat-resistant organic thermosetting resin in solvent; subjecting the resulting siliceous, resinous mixture to heat and subatmospheric pressure to thereby concentrate the mixture by evaporation of water and solvent, said concentrated mixture containing from 20% to 75% on a solvent-free basis of colloidal silica; and combining glass fiber material with the concentrated, resinous mixture containing colloidal silica.

7. A method of preparing, impregnating and coating resins capable of rendering uniform the electrical characteristics of glass laminates and materials impregnated with said resins, and of improving the physical properties and characteristics of heat resistance of said glass materials, which comprises: lowering the pH of an aqueous sol of colloidal silica to below 7 by the addition of weak acid; mixing said siliceous sol in approximately equal proportions with a water-miscible, organic solvent; and adding a dispersion of heat-resistant organic thermosetting resin to the resulting solvent-silica mixture to achieve a ratio of resin to silica of about 1:3 to 1:5 and a total solids content of about 30% to 40%.

8. A formed object made of glass fiber bonded with thermosetting resin, characterized by homogeneous transmission to UHF waves comprising: between 48% and 52% glass fibers, 35% to 42% of heat resistant organic thermosetting resin, and 10% to 13% colloidal silicon dioxide homogeneously dispersed in the resin.

9. A method of preparing an object composed essentially of glass fiber fabric impregnated with resin, said object having an improved resistance to heat and uniform electrical characteristics to UHF waves which comprises: lowering the pH of an aqueous sol of colloidal silica to below 7 by the addition of weak acid; mixing said sol in approximately equal proportions with a water-miscible, organic solvent; adding to this mixture a dispersion of heat resistant organic thermosetting resin in solvent; subjecting the resulting siliceous, resinous mixture to heat and subatmospheric pressure to thereby concentrate the mixture by evaporation of water and solvent, said concentrated mixture containing from 20% to 75% on a solvent-free basis of colloidal silica; impregnating a woven glass fiber fabric with said resin-silica mixture while said fabric is in normal form, then subjecting the fabric to tension applied on the bias of said fabric to reduce void spaces between the fibers, and curing the impregnated fabric while the fibers are in such tensioned and rearranged condition.

10. A method of preparing an object composed essentially of glass fiber fabric impregnated with resin, said object having improved resistance to heat and uniform electrical characteristics to UHF waves which comprises: lowering the pH of an aqueous sol of colloidal silica to below 7 by the addition of weak acid; mixing said siliceous sol in approximately equal proportions with a water miscible organic solvent; adding a dispersion of heat resistant organic thermosetting resin to the resulting solvent-silica mixture to achieve a ratio of resin to silica of about 1:3 to 1:5 and a total solids content of about 30% to 40%; subjecting the solvent-silica-resin mixture to gradual evaporation of solvent at temperatures below about 165° F. until a concentrated syrup is produced containing from between 20% and 60% by weight of colloidal silica; impregnating a woven glass fiber fabric with said resin-silica syrup while said fabric is in normal form, then subjecting the fabric to tension applied on the bias of said fabric to reduce void spaces between the fibers, and curing the impregnated fabric while the fibers are in such tensioned and rearranged condition to produce a solid object having mechanical shear strength.

11. A resin impregnated and coated glass material characterized by a high degree of uniformity of electrical characteristics, improved elasticity and flexural strength, and remarkable resistance to heat and burn-through at temperatures on the order of 2000° F. to 3000° F., comprising: a glass fiber fabric impregnated with a resin containing initially between 20% and 75% by weight of colloidal silica and cured, the cured material containing 48% to 52% by weight of glass fiber, 35% to 42% by weight of said resin and 10% to 13% by weight of colloidal silica.

References Cited in the file of this patent

UNITED STATES PATENTS

| Number | Name | Date |
|---|---|---|
| 741,592 | Roberts | Oct. 13, 1903 |
| 2,213,643 | Alton | Sept. 3, 1940 |
| 2,574,902 | Bechtold et al. | Nov. 13, 1951 |
| 2,577,484 | Rule | Dec. 4, 1951 |
| 2,609,320 | Modigliani | Sept. 2, 1952 |
| 2,635,056 | Powers | Apr. 14, 1953 |
| 2,657,149 | Iler | Oct. 27, 1953 |
| 2,662,865 | Beauchamp | Dec. 15, 1953 |
| 2,698,251 | Shea et al. | Dec. 28, 1954 |
| 2,722,488 | Lawsberg | Nov. 1, 1955 |
| 2,723,209 | Phillipps | Nov. 8, 1955 |
| 2,753,316 | Campbell | July 3, 1956 |
| 2,835,107 | Ward | May 20, 1958 |
| 2,930,106 | Wrotnowski | Mar. 29, 1960 |